United States Patent
Lee et al.

(10) Patent No.: US 8,761,680 B2
(45) Date of Patent: Jun. 24, 2014

(54) APPARATUS AND METHOD FOR MEASURING CHANNEL QUALITY BY USING RANGING SIGNAL IN BROADBAND WIRELESS COMMUNICATION SYSTEM

(75) Inventors: Ik-Beom Lee, Yongin-si (KR); Ha-Young Yang, Yongin-si (KR); Jae-Ho Jeon, Seongnam-si (KR); Sung-Kwon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 937 days.

(21) Appl. No.: 12/397,131

(22) Filed: Mar. 3, 2009

(65) Prior Publication Data

US 2009/0221282 A1 Sep. 3, 2009

(30) Foreign Application Priority Data

Mar. 3, 2008 (KR) .................. 10-2008-0019815

(51) Int. Cl.
*H04W 24/10* (2009.01)
*H04W 72/08* (2009.01)

(52) U.S. Cl.
USPC ....... 455/63.1; 455/501; 455/67.13; 375/254; 370/317

(58) Field of Classification Search
CPC .............................. H04W 24/10; H04W 72/08
USPC .............. 455/454, 501, 63.1, 67.13; 375/224, 375/147, 254; 370/208, 317
See application file for complete search history.

(56) References Cited

U.S. PATENT DOCUMENTS

| 2007/0058524 A1 * | 3/2007 | Modlin et al. ................ 370/208 |
| 2008/0019309 A1 * | 1/2008 | Kwun et al. .................. 370/329 |
| 2008/0031309 A1 * | 2/2008 | Chang et al. ................. 375/147 |
| 2008/0267273 A1 * | 10/2008 | Aue .............................. 375/224 |

FOREIGN PATENT DOCUMENTS

EP         1331783 A2 *   7/2003

* cited by examiner

*Primary Examiner* — Opiribo Georgewill
(74) *Attorney, Agent, or Firm* — Jefferson IP Law, LLP

(57) ABSTRACT

A method for measuring channel quality of a Base Station (BS) by using a ranging signal in a broadband wireless communication system is provided. The method includes estimating a time offset of the ranging signal received through a ranging channel, measuring channel quality by using the ranging signal including the time offset, determining whether distortion occurs in the measured channel quality by using the time offset, and compensating for distortion of the measured channel quality.

24 Claims, 8 Drawing Sheets

APPARATUS AND METHOD FOR MEASURING CHANNEL QUALITY BY USING RANGING SIGNAL IN BROADBAND WIRELESS COMMUNICATION SYSTEM

PRIORITY

This application claims the benefit under 35 U.S.C. §119(a) of a Korean patent application filed in the Korean Intellectual Property Office on Mar. 3, 2008 and assigned Serial No. 10-2008-0019815, the entire disclosure of which is hereby incorporated by reference.

BACKGROUND OF THE INVENTION

1. Field of the Invention

The present invention relates to a broadband wireless communication system. More particularly, the present invention relates to an apparatus and method for measuring channel quality by using a ranging signal in a broadband wireless communication system.

2. Description of the Related Art

In the next generation communication system, also known as the 4th Generation (4G) communication system, research is in progress to provide a Quality of Service (QoS) with a data transfer speed of about 100 Mbps. More particularly, the 4G communication system is currently being developed to ensure mobility and QoS in a Broadband Wireless Access (BWA) communication system, such as a Wireless Local Area Network (WLAN) system and a Wireless Metropolitan Area Network (WMAN) system. A representative example of the 4G communication system is described in the Institute of Electrical and Electronics Engineers (IEEE) 802.16 standard.

In a broadband wireless communication system, such as in the system based on the IEEE 802.16 standard, a Mobile Station (MS) transmits a pre-agreed ranging signal to a Base Station (BS) when an initial access process is performed between the MS and the BS. The BS then estimates a time offset of the MS by using the received ranging signal, and reports time offset information to the MS. Accordingly, the MS transmits a signal by considering the time offset. Thus, the time offset is compensated for. Further, the BS measures channel quality by using the ranging signal, and utilizes the measured channel quality in power control or the like to be performed later. For example, the channel quality may be a Carrier to Interference and Noise Ratio (CINR).

As described above, the BS measures the channel quality and the time offset by using the ranging signal received from the MS. However, in the process of measuring the channel quality, the BS measures the channel quality by using the ranging signal including the time offset. The channel quality measured using the ranging signal is utilized when communication is performed after the time offset is compensated for. Therefore, the channel quality measured using the ranging signal is lower than actual channel quality due to the time offset. That is, distorted channel quality information is used in a process for controlling communication, which leads to a problem of system performance deterioration.

Therefore, a need exists for a system and method for measuring channel quality in a broadband wireless communication system that avoids system performance deterioration.

SUMMARY OF THE INVENTION

An aspect of the present invention is to address at least the above-mentioned problems and/or disadvantages and to provide at least the advantages described below. Accordingly, an aspect of the present invention is to provide an apparatus and method for avoiding system performance deterioration caused by distorted channel quality information in a broadband wireless communication system.

Another aspect of the present invention is to provide an apparatus and method for measuring channel quality by using a ranging signal in a broadband wireless communication system.

Still another aspect of the present invention is to provide an apparatus and method for compensating for distortion of channel quality information measured using a ranging signal having a time offset in a broadband wireless communication system.

In accordance with an aspect of the present invention, a method of measuring channel quality of a Base Station (BS) by using a ranging signal in a broadband wireless communication system is provided. The method includes estimating a time offset of the ranging signal received through a ranging channel, measuring channel quality by using the ranging signal including the time offset, determining whether distortion occurs in the measured channel quality by using the time offset, and compensating for distortion of the measured channel quality.

In accordance with another aspect of the present invention, a BS apparatus for measuring channel quality by using a ranging signal in a broadband wireless system is provided. The apparatus includes an offset estimating unit for estimating a time offset of the ranging signal received through a ranging channel, a channel quality measuring unit for measuring channel quality by using the ranging signal including the time offset, and a channel quality compensation unit for determining whether distortion occurs in the measured channel quality by using the time offset and for compensating for distortion of the measured channel quality.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1A:
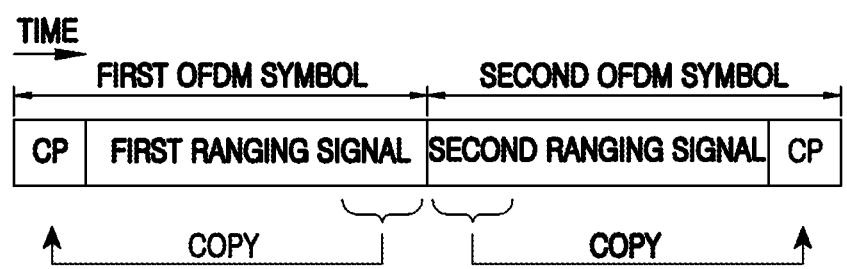
FIGS. 1A and 1B illustrate exemplary structures of a ranging signal in a broadband wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention described below is related to a technique for compensating for distortion of channel quality information measured using a ranging signal having a time offset in a broadband wireless communication system. Hereinafter, an Orthogonal Frequency Division Multiplexing (OFDM)/Orthogonal Frequency Division Multiple Access (OFDMA)-based wireless communication system will be described as an example. However, other types of wireless communication systems may be used in the present invention.

A ranging signal structure of a broadband wireless communication system according to an exemplary embodiment of the present invention will be described.

In a broadband wireless communication system according to an exemplary embodiment of the present invention, communication is performed in a frame unit. One frame is divided into a downlink subframe and an uplink subframe in a time axis. The downlink subframe and the uplink subframe are divided into OFDM symbols in the time axis. The downlink subframe is a duration for transmitting a signal from a Base Station (BS) to a Mobile Station (MS). The uplink subframe is a duration for transmitting a signal from the MS to the BS.

The MS transmits a ranging signal by using a ranging channel assigned to the uplink subframe. The ranging is classified into initial ranging for initial access and periodic ranging. The initial ranging channel is assigned to a duration consisting of two OFDM symbols. The periodic ranging channel is assigned to a duration consisting of one OFDM symbol.

Figure 1B:
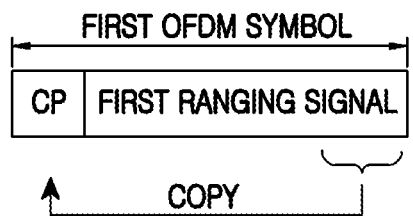

Therefore, in an initial ranging process, the MS continuously transmits two identical ranging signals as illustrated in FIG. 1A over a duration consisting of two symbols. As illustrated in FIG. 1A, a first symbol includes a Cyclic Prefix (CP) in a front portion of the first symbol, wherein the CP is a copy of an end portion of a time-domain signal. A second symbol includes a CP in an end portion of the second symbol, wherein the CP is a copy of a front portion of the time-domain signal. In a periodic ranging process, the MS transmits a ranging signal as illustrated in FIG. 1B over a duration consisting of one symbol. As illustrated in FIG. 1B, one symbol includes a CP in its front potion, wherein the CP is a copy of an end portion of a time-domain signal.

When extracting a ranging signal consisting of two symbols, such as the initial ranging signal, the BS extracts only a first signal, only a second signal or both of the two signals according to a system configuration. In each case, channel quality is distorted as follows due to a time offset. Herein, when the two signals are both extracted, channel quality using the ranging signal is an average of channel qualities measured respectively for the two ranging signals.

Figure 2A:
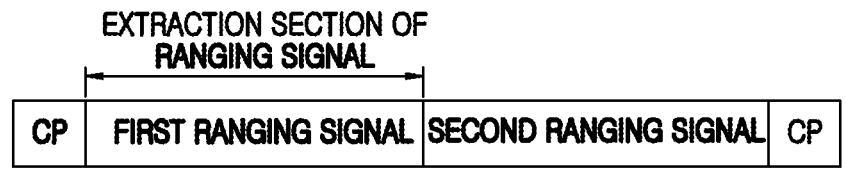
FIGS. 2A to 2D illustrate changes in an extraction section for a time offset when a first ranging signal is extracted from a ranging channel consisting of two symbols in a broadband wireless communication system according to an exemplary embodiment of the present invention.
Figure 2B:
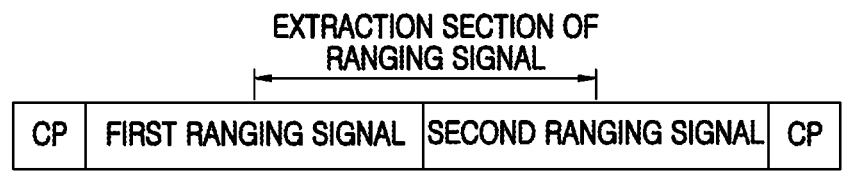
Figure 2C:
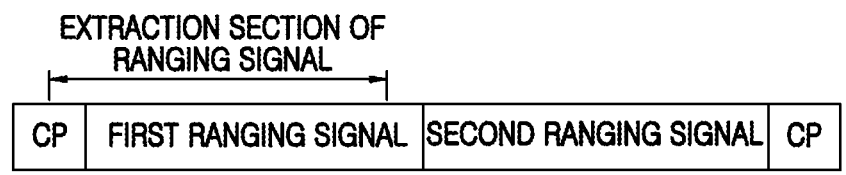
Figure 2D:
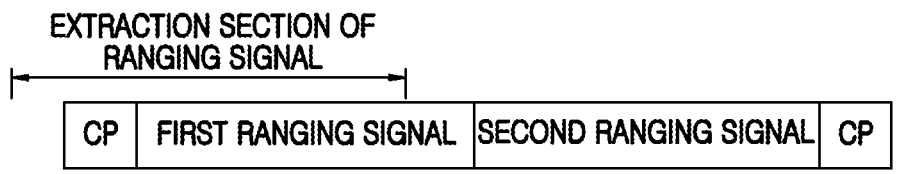

In a case of extracting only the first signal, occurrence of the time offset results in changes in an extraction region as illustrated in FIGS. 2A-2D. If the time offset does not exist, as illustrated in FIG. 2A, the extraction section of the ranging signal coincides with a first signal duration and channel quality is not distorted. If the time offset is a positive value, as illustrated in FIG. 2B, the extraction section of the ranging signal is partially deviated from a front portion of the first signal and partially includes a front portion of a second signal. Since extraction of the ranging signal is made within a ranging channel duration, channel quality is not distorted. If the time offset is a negative value and an absolute value of the time offset is less than or equal to a time length of a CP, as illustrated in FIG. 2C, the extraction section of the ranging signal is partially deviated from an end portion of the first signal and partially includes a CP of the first signal. Since extraction of the ranging signal is made within the ranging channel duration, channel quality is not distorted. If the time offset is a negative value and the absolute value of the time offset is greater than the time length of the CP, as illustrated in FIG. 2D, the extraction section of the ranging signal is partially deviated from the end portion of the first signal and includes the CP of the first signal and a duration other than the ranging channel duration. Since the extraction section of the ranging signal includes the duration other than the ranging channel duration, channel quality is distorted.

Figure 3A:
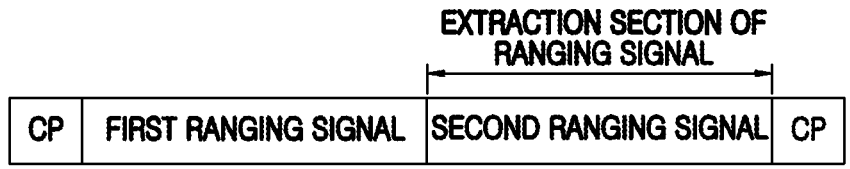
FIGS. 3A to 3D illustrate changes in an extraction section for a time offset when a second ranging signal is extracted from a ranging channel consisting of two symbols in a broadband wireless communication system according to an exemplary embodiment of the present invention.
Figure 3B:
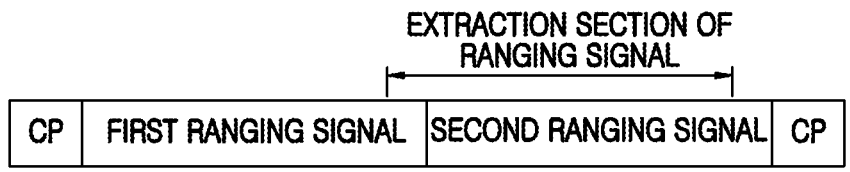
Figure 3C:
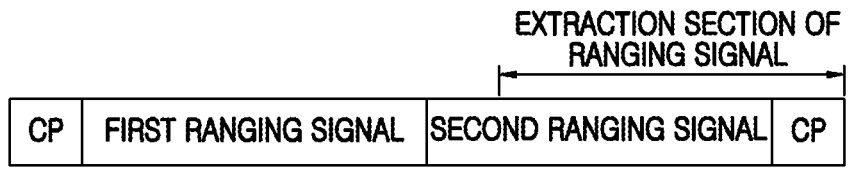
Figure 3D:
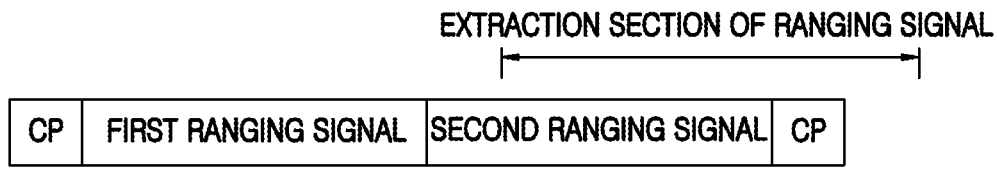

In a case of extracting only the second signal, occurrence of the time offset results in changes in an extraction region as illustrated in FIGS. 3A-3D. If the time offset does not exist, as illustrated in FIG. 3A, the extraction section of the ranging signal coincides with a second signal duration and channel quality is not distorted. If the time offset is a negative value, as illustrated in FIG. 3B, the extraction section of the ranging signal is partially deviated from an end portion of the second signal and partially includes an end portion of a first signal. Since extraction of the ranging signal is made within the ranging channel duration, channel quality is not distorted. If the time offset is a positive value and the absolute value of the time offset is less than or equal to the time length of the CP, as illustrated in FIG. 3C, the extraction section of the ranging signal is partially deviated from the front portion of the second signal, and partially or entirely includes a CP of the second signal. Since extraction of the ranging signal is made within the ranging channel duration, channel quality is not distorted. If the time offset is a positive value and the absolute value of the time offset is greater than the time length of the CP, as illustrated in FIG. 3D, the extraction section of the ranging signal is partially deviated from the front portion of the second signal and includes the CP of the second signal and a duration other than the ranging channel duration. Since the extraction section of the ranging signal includes the duration other than the ranging channel duration, channel quality is distorted.

In a case of extracting both of the two signals, occurrence of the time offset results in changes in an extraction region as illustrated in FIG. 4. If the time offset does not exist, as illustrated in FIG. 4A, the extraction section of the ranging signal coincides with a first signal duration and a second signal duration, and channel quality is not distorted. If the time offset is a positive value and an absolute value of the time offset is less than or equal to a time length of a CP, as illustrated in FIG. 4B, the extraction section of the ranging signal is partially deviated from a front portion of the first signal, includes the second signal duration and partially or entirely includes a CP duration of the second signal. Since extraction of the ranging signal is made within a ranging channel duration, channel quality is not distorted. If the time offset is a negative value and the absolute value of the time offset is less than or equal to the time length of the CP, as illustrated in FIG. 4C, the extraction section of the ranging signal is partially deviated from an end portion of the second signal, includes the first signal duration, and partially includes a CP duration of the first signal. Since extraction of the ranging signal is made within the ranging channel duration, channel quality is not distorted. If the time offset is a positive value and the absolute value of the time offset is greater than the time length of the CP duration, as illustrated in FIG. 4D, the extraction section of the ranging signal is partially deviated from the front portion of the first signal, includes the second signal duration and a CP duration of the second signal and includes a duration other than the ranging channel duration. Since the extraction section of the ranging signal includes the duration other than the ranging channel duration, channel quality is distorted. If the time offset is a negative value and the absolute value of the time offset is greater than the time length of the CP duration, as illustrated in FIG. 4E the extraction section of the ranging signal is partially deviated from the end portion of the second signal, includes the first signal duration and the CP duration of the first signal, and partially includes a duration other than the ranging channel duration. Since the extraction section of the ranging signal includes the duration other than the ranging channel duration, channel quality is distorted.

In a case of extracting a ranging signal consisting of one symbol similarly to the periodic ranging signal, channel quality is distorted as follows due to a time offset.

Figure 5A:
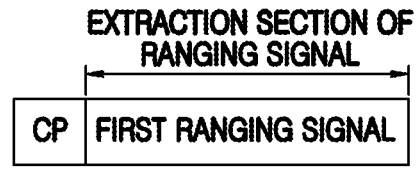
FIGS. 5A to 5D illustrate changes in an extraction section for a time offset when a ranging signal is extracted from a ranging channel consisting of one symbol in a broadband wireless communication system according to an exemplary embodiment of the present invention.
Figure 5B:
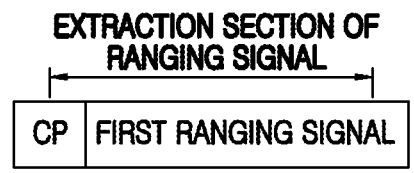
Figure 5C:
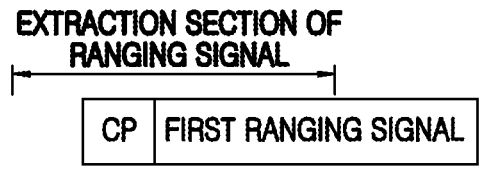
Figure 5D:
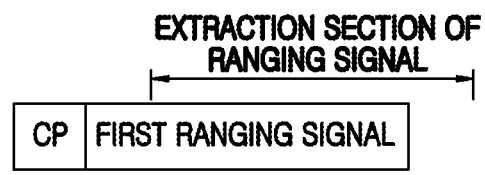

Occurrence of time offset results in changes in an extraction region is illustrated in FIGS. 5A-5D. If the time offset does not exist, as illustrated in FIG. 5A, the extraction section of the ranging signal coincides with a signal duration, and channel quality is not distorted. If the time offset is a negative value and an absolute value of the time offset is less than or equal to a time length of a CP duration, as illustrated in FIG. 5B, the extraction section of the ranging signal is partially deviated from an end portion of the ranging signal, and partially includes a CP duration. Since extraction of the ranging signal is made within a ranging channel duration, channel quality is not distorted. If the time offset is a negative value and the absolute value of the time offset is greater than the time length of the CP duration, as illustrated in FIG. 5C, the extraction section of the ranging signal is partially deviated from an end portion of the ranging signal, includes a CP duration and includes a duration other than the ranging channel duration. Since the extraction section of the ranging signal includes the duration other than the ranging channel duration, channel quality is distorted. If the time offset is a positive value, as illustrated in FIG. 5D, the extraction section of the ranging signal is partially deviated from a front portion of the ranging signal and includes a duration other than the ranging channel duration. Since the extraction section of the ranging signal includes the duration other than the ranging channel duration, channel quality is distorted.

As described above, distortion occurs when channel quality is measured using ranging signals as illustrated in FIG. 2B, FIG. 3D, FIGS. 4D and 4E, and FIGS. 5C and 5D. Accordingly, the BS recognizes cases where the distortion occurs and compensates the distortion of channel quality according to each case. For example, the distortion of each case is compensated for by using the following equations. Hereinafter, the channel quality is assumed to be a Carrier to Interference and Noise Ratio (CINR) for exemplary purposes only. Thus, the following equations may be applied also when the channel quality is a Signal to Noise Ratio (SNR), a Signal to Interference and Noise Ratio (SINR) and the like.

In the case of FIG. 2D, that is, if the time offset is a negative value and the absolute value of the time offset is greater than the time length of the CP duration, the BS compensates for the distortion of channel quality using Equation (1).

$$CINR_{cpsed} = CINR_{msed} \cdot \frac{N_{FFTSize}}{N_{FFTSize} + \alpha \cdot (GS + Toffset_{msed})} \quad (1)$$

In Equation (1) above, $CINR_{cpsed}$ denotes a compensated CINR, $CINR_{msed}$ denotes a measured CINR, $N_{FFTSize}$ denotes a Fast Fourier Transform (FFT) size, i.e., a time length of a ranging signal duration, $\alpha$ denotes a noise and interference power ratio of a duration other than a ranging channel duration to the ranging channel duration, Guard Sample (GS) denotes a time length of a CP duration and $Toffset_{msed}$ denotes a measured time offset. Herein, $Toffset_{msed}$ is a negative value whose absolute value is greater than GS.

If a ranging channel considered in Equation (1) above is an initial ranging channel and if a Round Trip Delay (RTD) duration exists in front of the initial ranging channel to switch from a downlink subframe to an uplink subframe, $\alpha$ is defined by Equation (2) below.

$$\alpha = \frac{P_{NI,RTD}}{P_{NI,intRNG}} \quad (2)$$

In Equation (2) above, $\alpha$ denotes a power ratio of a duration other than the ranging channel duration to the ranging channel duration, $P_{NI,RTD}$ denotes a noise and interference power of an RTD duration, and $P_{NI,intRNT}$ denotes a noise and interference power of an initial ranging channel duration.

In the case of FIG. 3D, that is, if the time offset is a positive value and the absolute value of the time offset is greater than the time length of the CP duration, the BS compensates for the distortion of channel quality by Equation (3) below.

$$CINR_{cpsed} = CINR_{msed} \cdot \frac{N_{FFTSize}}{N_{FFTSize} - \alpha \cdot (Toffset_{msed} - GS)} \quad (3)$$

In Equation (3) above, $CINR_{cpsed}$ denotes a compensated CINR, $CINR_{msed}$ denotes a measured CINR, $N_{FFTSize}$ denotes an FFT size, i.e., a time length of a ranging signal duration, $\alpha$ denotes a noise and interference power ratio of a duration other than a ranging channel duration to the ranging channel duration, GS denotes a time length of a CP duration and $Toffset_{msed}$ denotes a measured time offset. Herein, $Toffset_{msed}$ is a positive value whose absolute value is greater than GS.

If a ranging channel considered in Equation (3) is an initial ranging channel and if the initial ranging channel is followed by a traffic channel or a periodic ranging channel, $\alpha$ is defined by Equation (4) below.

$$\alpha = \frac{P_{NI,(prdRNG \text{ or } TRF)}}{P_{NI,intRNG}} \quad (4)$$

In Equation (4) above, $\alpha$ denotes a power ratio of a duration other than the ranging channel duration to the ranging channel duration, $P_{NI,(prdRNG \text{ or } TRF)}$ denotes a noise and interference power of a periodic ranging channel duration or a traffic channel duration, and $P_{NI,intRNT}$ denotes a noise and interference power of an initial ranging channel duration.

Figure 4A:
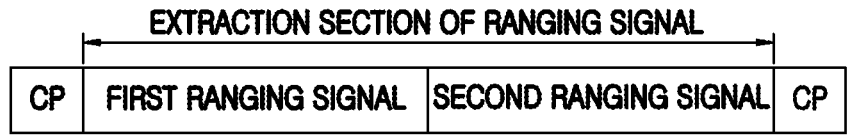
FIGS. 4A to 4E illustrate changes in an extraction section for a time offset when two ranging signals are both extracted from a ranging channel consisting of two symbols in a broadband wireless communication system according to an exemplary embodiment of the present invention.
Figure 4B:
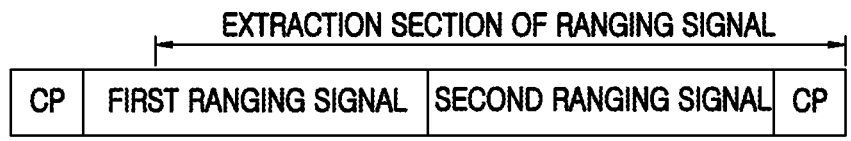
Figure 4C:
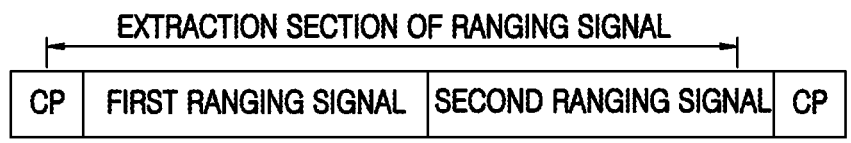
Figure 4D:
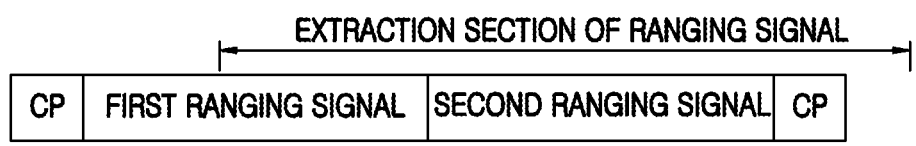
Figure 4E:
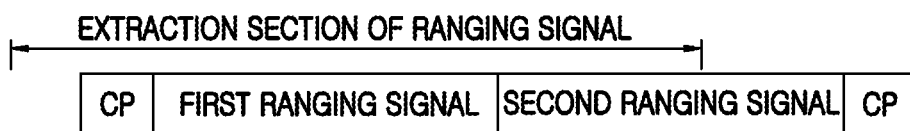

In the case of FIG. 4D, that is, when a first symbol and a second symbol are used in combination, if the time offset is a positive value and the absolute value of the time offset is greater than the time length of the CP duration, the BS compensates for the distortion of channel quality by Equation (5) below. In the case of FIG. 4E, that is, if the time offset is a negative value, and the absolute value of the time offset is greater than the time length of the CP duration, the BS compensates for the distortion of channel quality by Equation (6) below.

$$CINR_{cpsed} = \frac{N_{FFTSize} \cdot (1^{st}CINR_{msed} + 2^{nd}CINR_{msed})}{2 \cdot N_{FFTSize} - \alpha 1 \cdot (Toffset_{msed} - GS)} \quad (5)$$

In Equation (5) above, $CINR_{cpsed}$ denotes a compensated CINR, $N_{FFTSize}$ denotes an FFT size, i.e., a time length of a ranging signal duration, $1^{st}CINR_{msed}$ denotes a CINR measured using a first ranging signal, $2^{nd}CINR_{msed}$ denotes a CINR measured using a second ranging signal, $\alpha 1$ denotes a noise and interference power ratio of a duration located behind of a ranging channel to a ranging channel duration, GS denotes a time length of a CP duration and $Toffset_{msed}$ denotes a measured time offset. Herein, $Toffset_{msed}$ is a positive value whose absolute value is greater than GS.

$$CINR_{cpsed} = \frac{N_{FFTSize} \cdot (1^{st}CINR_{msed} + 2^{nd}CINR_{msed})}{2 \cdot N_{FFTSize} + \alpha 2 \cdot (GS + Toffset_{msed})} \quad (6)$$

In Equation (6) above, $CINR_{cpsed}$ denotes a compensated CINR, $N_{FFTSize}$ denotes an FFT size, i.e., a time length of a ranging signal duration, $1^{st}CINR_{msed}$ denotes a CINR measured using a first ranging signal, $2^{nd}CINR_{msed}$ denotes a CINR measured using a second ranging signal, $\alpha 2$ denotes a noise and interference power ratio of a duration located in front of a ranging channel to a ranging channel duration, GS denotes a time length of a CP duration, and $Toffset_{msed}$ denotes a measured time offset. Herein, $Toffset_{msed}$ is a negative value whose absolute value is greater than GS.

If the ranging channel considered in Equation (5) and Equation (6) above is an initial ranging channel, if an RTD duration is located in front of the initial ranging channel, and if the initial ranging channel is followed by a traffic channel or a period ranging channel, then $\alpha 1$ and $\alpha 2$ are defined by Equation (7) below.

$$\alpha 1 = \frac{P_{NI,RTD}}{P_{NI,intRNG}} \quad (7)$$

$$\alpha 2 = \frac{P_{NI,(prdRNG \text{ or } TRF)}}{P_{NI,intRNG}}$$

In Equation (7) above, $\alpha 1$ denotes a noise and interference power ratio of a duration located behind of a ranging channel and a ranging channel duration, $P_{NI,RTD}$ denotes a noise and interference power of an RTD duration, $P_{NI,intRNT}$ denotes a noise and interference power of an initial ranging channel duration, $\alpha 2$ denotes a noise and interference power ratio of a duration located in front of the ranging channel to the ranging channel duration and $P_{NI,(prdRNG \text{ or } TRF)}$ denotes a noise and interference power of a periodic ranging channel duration or a traffic channel duration.

In the case of FIG. 5C, that is, in a periodic ranging process, if the time offset is a negative value and the absolute value of the time offset is greater than the time length of the CP duration, the BS compensates for the distortion of channel quality using Equation (8) below. In the case of FIG. 5D, that is, if the time offset is a positive value, the BS compensates for the distortion of channel quality using Equation (9) below.

$$CINR_{cpsed} = CINR_{msed} \cdot \frac{N_{FFTSize}}{N_{FFTSize} + \alpha 2 \cdot (GS + Toffset_{msed})} \quad (8)$$

In Equation (8) above, $CINR_{cpsed}$ denotes a compensated CINR, $CINR_{msed}$ denotes a measured CINR, $N_{FFTSize}$ denotes an FFT size, i.e., a time length of a ranging signal duration, $\alpha 2$ denotes a noise and interference power ratio of a duration located in front of a ranging channel to a ranging channel duration, GS denotes a time length of a CP duration and $Toffset_{msed}$ denotes a measured time offset. Herein, $Toffset_{msed}$ is a negative value whose absolute value is greater than GS.

$$CINR_{cpsed} = CINR_{msed} \cdot \frac{N_{FFTSize}}{N_{FFTSize} - \alpha 1 \cdot (Toffset_{msed} - GS)} \quad (9)$$

In Equation (9) above, $CINR_{cpsed}$ denotes a compensated CINR, $CINR_{msed}$ denotes a measured CINR, $N_{FFTSize}$ denotes an FFT size, i.e., a time length of a ranging signal duration, $\alpha 1$ denotes a noise and interference power ratio of a duration other than a ranging channel duration to the ranging channel duration, GS denotes a time length of a CP duration and $Toffset_{msed}$ denotes a measured time offset. Herein, $Toffset_{msed}$ is a positive value whose absolute value is greater than GS.

If the ranging channel considered in Equation (8) and Equation (9) above is a periodic ranging channel if an initial ranging channel exists in front of the periodic ranging channel, and if the initial ranging channel is followed by a traffic channel, then $\alpha 1$ and $\alpha 2$ are defined by Equation (10) below.

$$\alpha 1 = \frac{P_{NI,TRF}}{P_{NI,prdRNG}} \qquad (10)$$

$$\alpha 2 = \frac{P_{NI,intRNG}}{P_{NI,prdRNG}}$$

In Equation (10) above, $\alpha 1$ denotes a noise and interference power ratio of a duration located behind of a ranging channel to a ranging channel duration, $P_{NI,TRF}$ denotes a noise and interference power of a traffic channel duration, $P_{NI,prdRNT}$ denotes a noise and interference power of a periodic ranging channel duration, $\alpha 2$ denotes a noise and interference power ratio of a duration located in front of a ranging channel to the ranging channel duration, and $P_{NI,intRNT}$ denotes a noise and interference power of an initial ranging channel duration.

Referring to Equation (1), Equation (3), Equation (5), Equation (6), Equation (8), and Equation (9) above, a compensated channel quality value is expressed as a product of a measured channel quality value and remaining terms. The remaining terms are $$\frac{N_{FFTSize}}{N_{FFTSize} + \alpha \cdot (GS + Toffset_{msed})}$$

in Equation (1), $$\frac{N_{FFTSize}}{N_{FFTSize} - \alpha \cdot (Toffset_{msed} - GS)}$$

in Equation (3), $$\frac{N_{FFTSize}}{N_{FFTSize} - \alpha 1 \cdot (Toffset_{msed} - GS)}$$

in Equation (5), $$\frac{N_{FFTSize}}{N_{FFTSize} + \alpha 2 \cdot (GS + Toffset_{msed})}$$

in Equation (6), $$\frac{N_{FFTSize}}{N_{FFTSize} + \alpha 2 \cdot (GS + Toffset_{msed})}$$

in Equation (8) and $$\frac{N_{FFTSize}}{N_{FFTSize} - \alpha 1 \cdot (Toffset_{msed} - GS)}$$

in Equation (9). That is, in each equation, the channel quality is obtained by compensating for a result obtained by multiplying the measured channel quality by the remaining terms. Thus, the remaining terms are regarded as values that compensate for the measured channel quality. Therefore, the remaining terms other than the measured channel quality expressed in each equation are hereinafter referred to as 'compensation coefficients'.

In the compensation coefficients of the above equations, a numerator of each compensation coefficient has an FFT size and denotes a time length of a ranging signal duration. The denominator of each compensation coefficient is a sum or a difference between a term including an offset length and the FFT size and is a positive value whose absolute value is less than the FFT size. That is, the denominator of each compensation coefficient is $N_{FFTSize}+\alpha \cdot (GS+Toffset_{msed})$ in Equation (1), $N_{FFTSize}-\alpha \cdot (Toffset_{msed}-GS)$ in Equation (3), $N_{FFTSize}-\alpha 1 \cdot (Toffset_{msed}-GS)$ in Equation (5), $N_{FFTSize}+\alpha 2 \cdot (GS+Toffset_{msed})$ in Equation (6), $N_{FFTSize}+\alpha 2 \cdot (GS+Toffset_{msed})$ in Equation (8), and $N_{FFTSize}-\alpha 1 \cdot (Toffset_{msed}-GS)$ in Equation (9). The denominator of each compensation coefficient is a value obtained by subtracting the product of interference and noise of signals other than a ranging signal extracted due to an offset from the time length of the ranging signal duration and denotes a sum of a length of a part of duration of a ranging signal contributing to the measured channel quality value and an effective length of other signals in consideration of the interference and noise. The denominator of each compensation coefficient is hereinafter referred to as an 'effective measurement length'.

An operation and structure of a BS for compensating for channel quality measured using a ranging signal will be described.

Figure 6:
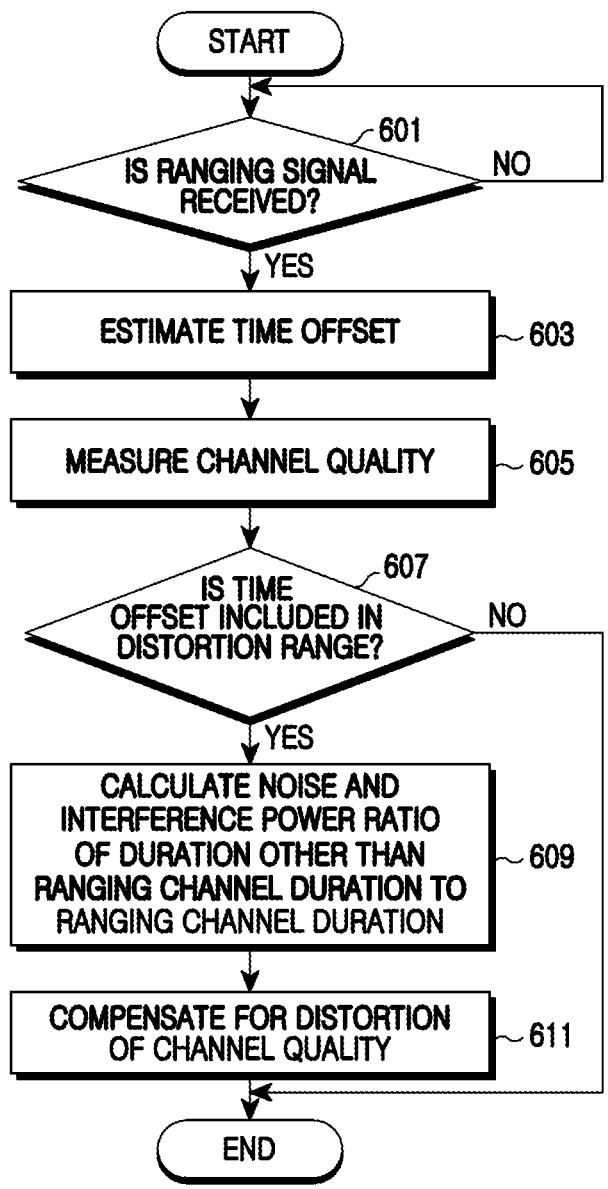
FIG. 6 is a flowchart illustrating a process of measuring channel quality using a ranging signal by a Base Station (BS) in a broadband wireless communication system according to an exemplary embodiment of the present invention.

FIG. 6 is a flowchart illustrating a process of measuring channel quality using a ranging signal by a BS in a broadband wireless communication system according to an exemplary embodiment of the present invention.

Referring to FIG. 6, the BS determines whether a ranging signal is received in step 601. That is, the BS detects a signal received in a ranging channel duration. A ranging channel may be defined as two OFDM symbol durations as illustrated in FIG. 1A or one OFDM symbol duration as illustrated in FIG. 1B. For example, an initial ranging channel is defined as two OFDM symbol durations and a periodic ranging channel is defined as one OFDM symbol duration.

When the ranging signal is received, in step 603, the BS estimates a time offset by using the ranging signal. More specifically, the BS performs a cross correlation operation on a signal received in the ranging channel duration with a preset ranging signal, and estimates the time offset by determining a peak point of a cross correlation graph.

After estimating the time offset, in step 605, the BS measures channel quality by using the ranging signal. The channel quality includes at least one of a CINR, an SINR and an SNR. The channel quality measured in step 605 is measured using the ranging signal including the time offset. If a plurality of signals is used to measure the channel quality, the BS averages the channel qualities measured using each of the plurality of ranging signals.

After measuring the channel quality, in step 607, the BS determines whether the time offset estimated in step 603 is included in a distortion range in which distortion of channel quality occurs. In other words, the BS determines whether an extraction section of the ranging signal includes a duration other than the ranging channel duration. If the time offset is not included in the distortion range, the procedure of FIG. 6 ends. The distortion range differs depending on a format of the ranging channel and a position of a ranging signal to be extracted.

For example, if the ranging channel is defined as two OFDM symbol durations and if the first ranging signal is extracted, in step 607, the BS determines whether the time offset is a negative value and whether the absolute value of the time offset is greater than the time length of the CP duration as illustrated in FIG. 2D. Alternatively, if the ranging channel is defined as two OFDM symbol durations and if the second ranging signal is extracted, in step 607, the BS determines whether the time offset is a positive value and the absolute value of the time offset is greater than the time length of the CP duration as illustrated in FIG. 3D. Alternatively, if the ranging channel is defined as two OFDM symbol durations and if the two ranging signals are both extracted, in step 607, the BS determines whether the time offset is a positive value and the absolute value of the time offset is greater than the time length of the CP duration as illustrated in FIG. 4D or whether the time offset is a negative value and the absolute value of the time offset is greater than the time length of the CP duration as illustrated in FIG. 4E. Alternatively, if the ranging channel is defined as one OFDM symbol duration, in step 607, the BS determines whether the time offset is a negative value and the absolute value of the time offset is greater than the time length of the CP duration as illustrated in FIG. 5C or whether the time offset is a positive value as illustrated in FIG. 5D.

On the other hand, if the time offset is included in the distortion range, in step 609, the BS determines a noise and interference power ratio of a duration other than a ranging channel duration to the ranging channel duration. That is, the BS determines whether a duration at which channel quality is distorted is a duration located in front of the ranging channel duration or a duration located behind of the ranging channel duration according to the result determined in step 607, and determines a noise and interference power ratio of the determined duration to the ranging channel duration.

In step 611, the BS compensates for distortion caused by the time offset in the channel quality measured in step 605 by using a noise and interference power ratio of a duration other than the ranging channel duration to the ranging channel duration, a time length of a CP duration, an FFT size and a time offset. Specifically, the BS multiplies the noise and interference power ratio by a time length of a duration other than the ranging channel duration in an extraction section of a ranging signal and adds the multiplication result and the time length of the ranging signal. Thus, the BS determines an effective measurement length of the extraction section of the ranging signal in consideration of the noise and interference power ratio. Further, the BS divides the time length of the ranging signal duration by the effective measurement length of the extraction section of the ranging signal, thereby determining a compensation coefficient. Finally, the BS multiplies the compensation coefficient by the measured channel quality value, thereby obtaining a compensated channel quality value. An equation for the distortion compensation differs depending on a format of the ranging channel and a position of a ranging signal to be extracted.

For example, if the ranging channel is defined as two OFDM symbol durations and if the first ranging signal is extracted, in step 609, the BS compensates for distortion of channel quality as expressed by Equation (1) above. Alternatively, if the ranging channel is defined as two OFDM symbol durations and if the second ranging signal is extracted, in step 609, the BS compensates for distortion of channel quality as expressed by Equation (3) above. Alternatively, if the ranging channel is defined as two OFDM symbol durations and if the two ranging signals are both extracted, in step 609, the BS compensates for distortion of channel quality as expressed by Equation (5) or Equation (6) above. Alternatively, if the ranging channel is defined as one OFDM symbol duration, in step 609, the BS compensates for distortion of channel quality as expressed by Equation (8) or Equation (9) above.

Figure 7:
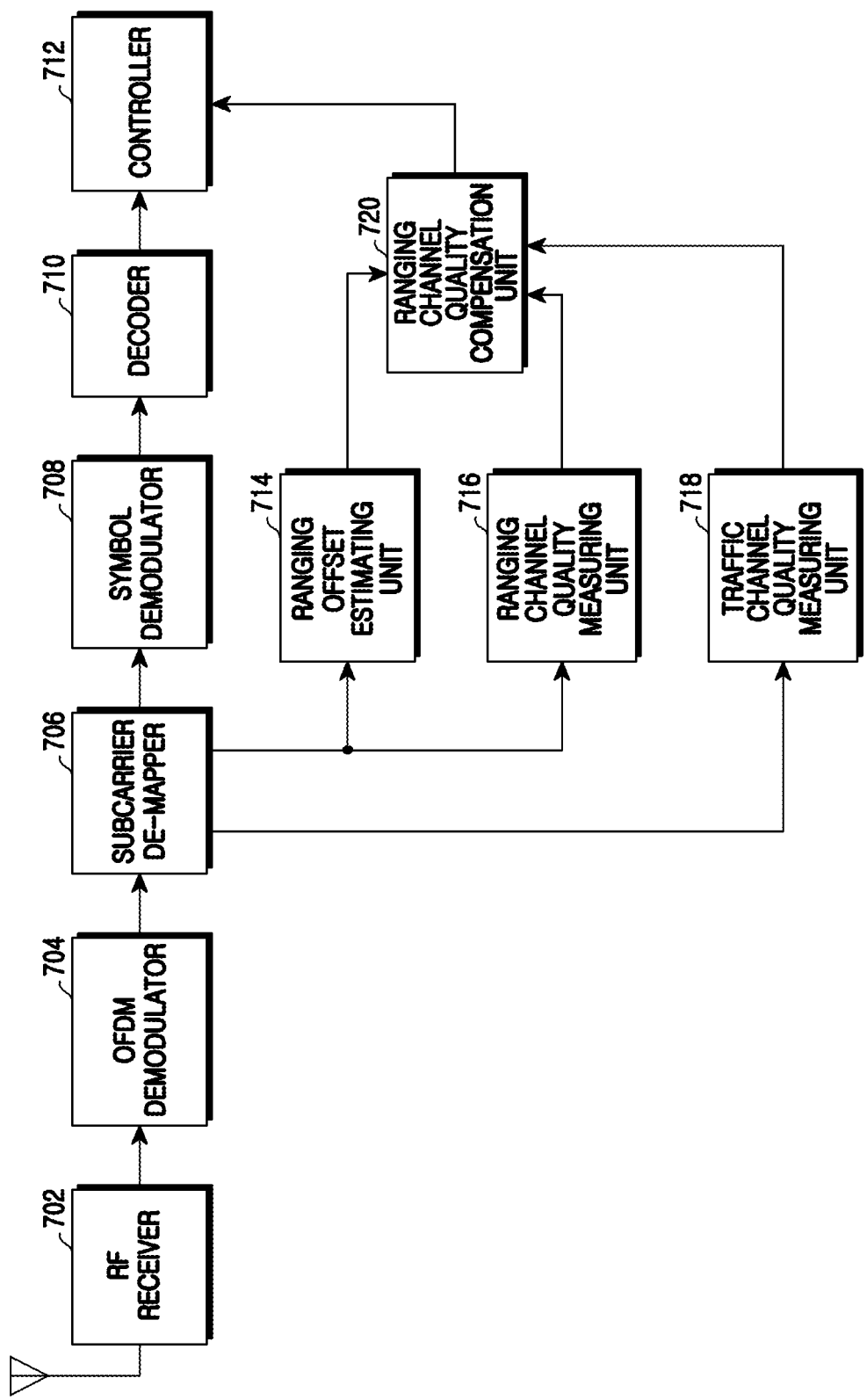
FIG. 7 is a block diagram illustrating a structure of a BS in a broadband wireless communication system according to an exemplary embodiment of the present invention.

FIG. 7 is a block diagram illustrating a structure of a BS in a broadband wireless communication system according to an exemplary embodiment of the present invention.

Referring to FIG. 7, the BS includes a Radio Frequency (RF) receiver 702, an OFDM demodulator 704, a subcarrier de-mapper 706, a symbol demodulator 708, a decoder 710, a controller 712, a ranging offset estimating unit 714, a ranging channel quality measuring unit 716, a traffic channel quality measuring unit 718 and a ranging channel quality compensation unit 720.

The RF receiver 702 down-converts an RF signal received through an antenna into a baseband signal. The OFDM demodulator 704 divides a signal provided from the RF receiver 702 in an OFDM symbol unit, removes a CP and restores complex symbols mapped to a frequency domain by performing an FFT operation. The subcarrier de-mapper 706 divides the complex symbols mapped to the frequency domain according to a process path. That is, among received signals, the subcarrier de-mapper 706 provides a ranging signal received through a ranging channel to the OFDM demodulator 704 and the subcarrier de-mapper 706, and provides a traffic signal to the traffic channel quality measuring unit 718.

The symbol demodulator 708 demodulates the complex symbols to convert them into a bit-stream. The decoder 710 performs channel decoding on the bit-stream to restore an information bit-stream. The controller 712 provides overall controls to the BS. For example, the controller 712 provides controls to facilitate communication by using channel quality information of an MS, wherein the channel quality information is measured using the ranging signal provided from the ranging channel quality compensation unit 720.

The ranging offset estimating unit 714 estimates a time offset by using the received ranging signal. Specifically, the ranging offset estimating unit 714 performs a cross correlation operation on a signal received in the ranging channel duration with a preset ranging signal, and estimates the time offset by determining a peak point of a cross correlation graph.

The ranging channel quality measuring unit 716 measures channel quality by using the ranging signal. The channel quality includes at least one of a CINR, an SINR and an SNR. The channel quality measured by the ranging channel quality measuring unit 716 is measured using the ranging signal including the time offset. If a plurality of signals is used to measure the channel quality, the ranging channel quality measuring unit 716 averages the channel qualities measured using each of the plurality of ranging signals.

The traffic channel quality measuring unit 718 measures channel quality of a traffic channel by using a traffic signal. That is, the traffic channel quality measuring unit 718 measures a noise and interference power of a duration adjacent to a ranging channel duration required to compensate for distortion of channel quality using a ranging signal, and provides information on the noise and interference power information of the duration adjacent to the ranging channel duration to the ranging channel quality compensation unit 720.

According to time offset information provided from the ranging offset estimating unit 714, the ranging channel quality compensation unit 720 determines whether channel quality information measured by the ranging channel quality measuring unit 716 is distorted. That is, the ranging channel quality compensation unit 720 determines whether the time offset is included in a distortion range in which distortion of channel quality occurs. The distortion range differs depending on a format of the ranging channel and a position of a ranging signal to be extracted.

For example, if the ranging channel is defined as two OFDM symbol durations and if the first ranging signal is extracted, the ranging channel quality compensation unit 720 determines whether the time offset is a negative value and whether the absolute value of the time offset is greater than the time length of the CP duration as illustrated in FIG. 2D. Alternatively, if the ranging channel is defined as two OFDM symbol durations and if the second ranging signal is extracted, the ranging channel quality compensation unit 720 determines whether the time offset is a positive value and the absolute value of the time offset is greater than the time length of the CP duration as illustrated in FIG. 3D. Alternatively, if the ranging channel is defined as two OFDM symbol durations and if the two ranging signals are both extracted, the ranging channel quality compensation unit 720 determines whether the time offset is a negative value and whether the absolute value of the time offset is greater than the time length of the CP duration as illustrated in FIG. 4D or whether the time offset is a positive value and whether the absolute value of the time offset is greater than the time length of the CP duration as illustrated in FIG. 4E. Alternatively, if the ranging channel is defined as one OFDM symbol duration, the ranging channel quality compensation unit 720 determines whether the time offset is a negative value and whether the absolute value of the time offset is greater than the time length of the CP duration as illustrated in FIG. 5C or whether the time offset is a positive value as illustrated in FIG. 5D.

If it is determined that distortion occurs, the ranging channel quality compensation unit 720 compensates for distortion of the channel quality measured by the ranging channel quality measuring unit 716. Otherwise, if it is determined that distortion does not occur, the ranging channel quality compensation unit 720 delivers the channel quality information measured by the ranging channel quality measuring unit 716 to the controller 712. An operation for compensating for distortion of the channel quality is performed as follows by the ranging channel quality compensation unit 720.

The ranging channel quality compensation unit 720 determines a noise and interference power ratio of a duration other than a ranging channel duration to the ranging channel duration. That is, the ranging channel quality measuring unit 716 determines whether a duration at which channel quality is distorted is a duration located in front of the ranging channel duration or a duration located behind of the ranging channel duration, and determines a noise and interference power ratio of the determined duration to the ranging channel duration. The ranging channel quality measuring unit 716 compensates for distortion caused by the time offset in the channel quality measured by the ranging channel quality measuring unit 716 by using a noise and interference power ratio of a duration other than the ranging channel duration to the ranging channel duration, a time length of a CP duration, an FFT size and a time offset. Specifically, the ranging channel quality compensation unit 720 multiplies the noise and interference power ratio by a time length of a duration other than the ranging channel duration in an extraction section of a ranging signal, and adds the multiplication result and the time length of the ranging signal. Thus, the BS determines an effective measurement length of the extraction section of the ranging signal in consideration of the noise and interference power ratio. Further, the ranging channel quality compensation unit 720 divides the time length of the ranging signal duration by the effective measurement length of the extraction section of the ranging signal, thereby determining a compensation coefficient. Finally, the ranging channel quality compensation unit 720 multiplies the compensation coefficient by the measured channel quality value, thereby obtaining a compensated channel quality value. Detailed examples of an equation for the distortion compensation may differ depending on a format of the ranging channel and a position of a ranging signal to be extracted.

For example, if the ranging channel is defined as two OFDM symbol durations and if the first ranging signal is extracted, the ranging channel quality compensation unit 720 compensates for distortion of channel quality as expressed by Equation (1) above. Alternatively, if the ranging channel is defined as two OFDM symbol durations and if the second ranging signal is extracted, the ranging channel quality compensation unit 720 compensates for distortion of channel quality as expressed by Equation (3) above. Alternatively, if the ranging channel is defined as two OFDM symbol durations and if the two ranging signals are both extracted, the ranging channel quality compensation unit 720 compensates for distortion of channel quality as expressed by Equation (5) or Equation (6) above. Alternatively, if the ranging channel is defined as one OFDM symbol duration, the ranging channel quality compensation unit 720 compensates for distortion of channel quality as expressed by Equation (8) or Equation (9) above.

In an exemplary implementation, the BS measures channel quality by using a ranging signal and compensates for distortion of channel quality by one of Equation (1), Equation (3), Equation (5), Equation (6), Equation (8) and Equation (9) above.

The BS may also compensate for distortion of channel quality by using a pre-stored table. That is, in an exemplary implementation, the BS has a table stored therein that includes compensated channel quality values determined by Equation (1), Equation (3), Equation (5), Equation (6), Equation (8) and Equation (9) above. Thus, the BS searches for a compensated channel quality value corresponding to a combination of the measured channel quality and the time offset.

The table stores compensated channel quality values corresponding to combinations of the measured channel quality and the time offset. Referring to Equation (1), Equation (3), Equation (5), Equation (6), Equation (8) and Equation (9) above, a noise and interference power ratio of a duration other than a ranging channel duration to the ranging channel duration is used to determine the compensated channel quality values. Various values may be used for the noise and interference power ratio. Thus, channel quality values determined based on a statistical noise and interference power ratio are used depending on a ratio of channel environments observed in an actual communication environment. Therefore, the BS searches the table by using only the measured channel quality and the time offset without considering the noise and interference power ratio.

Figure 8:
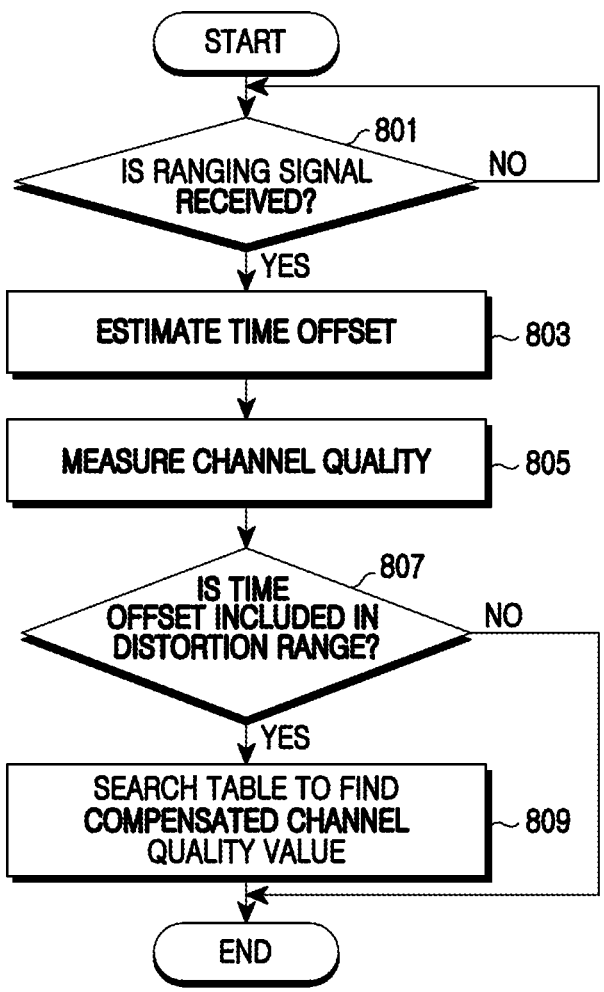
FIG. 8 is a flowchart illustrating a process of measuring channel quality using a ranging signal by a BS in a broadband wireless communication system according to an exemplary embodiment of the present invention.

FIG. 8 is a flowchart illustrating a process for measuring channel quality using a ranging signal by a BS in a broadband wireless communication system according to an exemplary embodiment of the present invention.

Referring to FIG. 8, the BS determines whether a ranging signal is received in step 801. That is, the BS detects a signal received in a ranging channel duration. A ranging channel may be defined as two OFDM symbol durations as illustrated in FIG. 1A or one OFDM symbol duration as illustrated in FIG. 1B. For example, an initial ranging channel is defined as two OFDM symbol durations, and a periodic ranging channel is defined as one OFDM symbol duration.

When the ranging signal is received, in step 803, the BS estimates a time offset by using the ranging signal. More specifically, the BS performs a cross correlation operation on a signal received in the ranging channel duration with a preset ranging signal and estimates the time offset by determining a peak point of a cross correlation graph.

After estimating the time offset, in step 805, the BS measures channel quality by using the ranging signal. The channel quality includes at least one of a CINR, an SINR and an SNR. The channel quality measured in step 805 is measured using the ranging signal including the time offset. If a plurality of signals is used to measure the channel quality, the BS averages the channel qualities measured using each of the plurality of ranging signals.

After measuring the channel quality, in step 807, the BS determines whether the time offset estimated in step 803 is included in a distortion range in which distortion of channel quality occurs. In other words, the BS determines whether an extraction section of the ranging signal includes a duration other than the ranging channel duration. If the time offset is not included in the distortion range, the procedure of FIG. 8 ends. The distortion range differs depending on a format of the ranging channel and a position of a ranging signal to be extracted.

For example, if the ranging channel is defined as two OFDM symbol durations and if the first ranging signal is extracted, in step 807, the BS determines whether the time offset is a negative value and whether the absolute value of the time offset is greater than the time length of the CP duration as illustrated in FIG. 2D. Alternatively, if the ranging channel is defined as two OFDM symbol durations and if the second ranging signal is extracted, in step 807, the BS determines whether the time offset is a positive value and whether the absolute value of the time offset is greater than the time length of the CP duration as illustrated in FIG. 3D. Alternatively, if the ranging channel is defined as two OFDM symbol durations and if the two ranging signals are both extracted, in step 807, the BS determines whether the time offset is a negative value and whether the absolute value of the time offset is greater than the time length of the CP duration as illustrated in FIG. 4D or whether the time offset is a positive value and whether the absolute value of the time offset is greater than the time length of the CP duration as illustrated in FIG. 4E. Alternatively, if the ranging channel is defined as one OFDM symbol duration, in step 807, the BS determines whether the time offset is a negative value and whether the absolute value of the time offset is greater than the time length of the CP duration as illustrated in FIG. 5C or whether the time offset is a positive value as illustrated in FIG. 5D.

On the other hand, if the time offset is included in the distortion range, in step 809, the BS searches a table to find a compensated channel quality value corresponding to a combination of the time offset and the measured channel quality. The table includes channel quality values determined by multiplying the measured channel quality value and a compensation coefficient whose denominator includes an effective measurement length obtained from a time offset, noise and interference, as expressed by Equation (1), Equation (3), Equation (5), Equation (6), Equation (8) and Equation (9) above.

In FIG. 8, each functional block constituting the BS of FIG. 7 operates as follows.

The RF receiver 702 down-converts an RF signal received through an antenna into a baseband signal. The OFDM demodulator 704 divides a signal provided from the RF receiver 702 in an OFDM symbol unit, removes a CP and restores complex symbols mapped to a frequency domain by performing an FFT operation. The subcarrier de-mapper 706 classifies the complex symbols mapped to the frequency domain according to a process path. That is, among received signals, the subcarrier de-mapper 706 provides a ranging signal received through a ranging channel to the OFDM demodulator 704 and the subcarrier de-mapper 706, and provides a traffic signal to the traffic channel quality measuring unit 718.

The symbol demodulator 708 demodulates the complex symbols to convert the complex symbols into a bit-stream. The decoder 710 performs channel decoding on the bit-stream to restore an information bit-stream. The controller 712 provides overall control to the BS. For example, the controller 712 provides control to facilitate communication by using channel quality information of an MS, wherein the channel quality information is measured using the ranging signal provided from the ranging channel quality compensation unit 720.

The ranging offset estimating unit 714 estimates a time offset by using the received ranging signal. Specifically, the ranging offset estimating unit 714 performs a cross correlation operation on a signal received in the ranging channel duration with a preset ranging signal, and estimates the time offset by determining a peak point of a cross correlation graph.

The ranging channel quality measuring unit 716 measures channel quality by using the ranging signal. The channel quality includes at least one of a CINR, an SINR and an SNR. The channel quality measured by the ranging channel quality measuring unit 716 is measured using the ranging signal including the time offset. If a plurality of signals is used to measure the channel quality, the ranging channel quality measuring unit 716 averages the channel qualities measured using each of the plurality of ranging signals.

The traffic channel quality measuring unit 718 measures channel quality of a traffic channel by using a traffic signal. That is, the traffic channel quality measuring unit 718 measures a noise and interference power of a duration adjacent to a ranging channel duration required to compensate for distortion of channel quality using a ranging signal. The traffic channel quality measuring unit 718 provides information on the noise and interference power information of the duration adjacent to the ranging channel duration to the ranging channel quality compensation unit 720.

According to time offset information provided from the ranging offset estimating unit 714, the ranging channel quality compensation unit 720 determines whether channel quality information measured by the ranging channel quality measuring unit 716 is distorted. That is, the ranging channel quality compensation unit 720 determines whether the time offset is included in a distortion range in which distortion of channel quality occurs. The distortion range differs depending on a format of the ranging channel and a position of a ranging signal to be extracted.

For example, if the ranging channel is defined as two OFDM symbol durations and if the first ranging signal is extracted, the ranging channel quality compensation unit 720 determines whether the time offset is a negative value and whether the absolute value of the time offset is greater than the time length of the CP duration value as illustrated in FIG. 2D. Alternatively, if the ranging channel is defined as two OFDM symbol durations and if the second ranging signal is extracted, the ranging channel quality compensation unit 720 determines whether the time offset is a positive value and whether the absolute value of the time offset is greater than the time length of the CP duration as illustrated in FIG. 3D. Alternatively, if the ranging channel is defined as two OFDM symbol durations and if the two ranging signals are both extracted, the ranging channel quality compensation unit 720 determines whether the time offset is a negative value and whether the absolute value of the time offset is greater than the time length of the CP duration as illustrated in FIG. 4D or whether the time offset is a positive value and whether the absolute value of the time offset is greater than the time length of the CP duration as illustrated in FIG. 4E. Alternatively, if the ranging channel is defined as one OFDM symbol duration, the ranging channel quality compensation unit 720 determines whether the time offset is a negative value and whether the absolute value of the time offset is greater than the time length of the CP duration as illustrated in FIG. 5C or whether the time offset is a positive value as illustrated in FIG. 5D.

If it is determined that distortion occurs, the ranging channel quality compensation unit 720 compensates for distortion of the channel quality measured by the ranging channel quality measuring unit 716. Otherwise, if it is determined that distortion does not occur, the ranging channel quality compensation unit 720 delivers the channel quality information measured by the ranging channel quality measuring unit 716 to the controller 712. To compensate for distortion of the channel quality, the ranging channel quality compensation unit 720 searches a table to find a compensated channel quality value corresponding to a combination of the time offset estimated by the ranging offset estimating unit 714 and the channel quality measured by the ranging channel quality measuring unit 716. That is, the ranging channel quality compensation unit 720 may have a table stored therein that includes compensated channel quality values, or may access a storage medium storing the table including compensated channel quality values. The table includes channel quality values determined by multiplying the measured channel quality value and a compensation coefficient whose denominator includes an effective measurement length obtained from a time offset, noise and interference, as expressed by Equation (1), Equation (3), Equation (5), Equation (6), Equation (8) and Equation (9) above.

According to exemplary embodiments of the present invention, by compensating for distortion of channel quality information measured using a ranging signal having a time offset in a broadband wireless communication system, it is possible to avoid system performance deterioration caused by the use of distorted channel quality information.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method for measuring channel quality of a Base Station (BS) by using a ranging signal in a wireless communication system, the method comprising:
    estimating a time offset of the ranging signal received through a ranging channel;
    measuring channel quality by using a signal from an extraction section of the ranging signal determined based on the estimated time offset;
    determining whether the extraction section of the ranging signal starts no earlier and ends no later than a ranging channel duration by using the time offset;
    determining whether distortion occurs in the measured channel quality based on a result of the determination of whether the extraction section of the ranging signal starts no earlier and ends no later than the ranging channel duration; and
    compensating for distortion of the measured channel quality,
    wherein the ranging channel duration comprises one of an initial ranging signal comprising exactly two symbols in a time axis and a periodic ranging signal comprising exactly one symbol in the time axis.

2. The method of claim 1, wherein the determining of whether distortion occurs in the measured channel quality comprises:
    if the extraction section of the ranging signal starts earlier or ends later than the ranging channel duration, determining that distortion occurs; and
    if the extraction section of the ranging signal starts no earlier and ends no later than the ranging channel duration, determining that distortion does not occur.

3. The method of claim 2, wherein the determining of whether the extraction section of the ranging signal starts no earlier and ends no later than the ranging channel duration comprises, when the ranging channel is defined as two symbol durations and a first ranging signal is extracted, determining that the extraction section of the ranging signal starts earlier than the ranging channel duration if the time offset is a negative value and if an absolute value of the time offset is greater than a time length of a Cyclic Prefix (CP) duration.

4. The method of claim 2, wherein the determining of whether the extraction section of the ranging signal starts no earlier and ends no later than the ranging channel duration comprises, when the ranging channel is defined as two symbol durations and a second ranging signal is extracted, determining that the extraction section of the ranging signal ends later than the ranging channel duration if the time offset is a positive value and if an absolute value of the time offset is greater than a time length of a Cyclic Prefix (CP) duration.

5. The method of claim 2, wherein the determining of whether the extraction section of the ranging signal starts no earlier and ends no later than the ranging channel duration comprises, when the ranging channel is defined as two symbol durations and two ranging signals are both extracted, determining that the extraction section of the ranging signal starts earlier or ends later than the ranging channel duration if the time offset comprises one of a negative value and a positive value and if an absolute value of the time offset is greater than a time length of a Cyclic Prefix (CP) duration.

6. The method of claim 2, wherein the determining of whether the extraction section of the ranging signal starts no earlier and ends no later than the ranging channel duration comprises, when the ranging channel is defined as one symbol duration, determining that the extraction section of the ranging signal starts earlier or ends later than the ranging channel duration if one of the time offset comprises a negative value and if an absolute value of the time offset is greater than a time length of a Cyclic Prefix (CP) duration, and the time offset comprises a positive value.

7. The method of claim 1, wherein the compensating for distortion comprises searching a table comprising channel quality values determined using at least one of a noise and interference power ratio of the duration starting earlier or ending later than the ranging channel duration comprised in the extraction section of the ranging signal to the ranging channel duration, a time length of a Cyclic Prefix (CP) duration, a time length of the ranging signal and a time offset to find one compensated channel quality value corresponding to a combination of the time offset and the measured channel quality.

8. The method of claim 7, wherein the compensated channel quality values are determined by multiplying the measured channel quality value by a compensation coefficient whose denominator comprises an effective measurement length obtained from the time offset and the noise and interference ratio.

9. The method of claim 8, wherein the compensated channel quality values are determined using one of the equations below:

$$CINR_{cpsed} = CINR_{msed} \cdot \frac{N_{FFTSize}}{N_{FFTSize} + \alpha \cdot (GS + Toffset_{msed})},$$

wherein $CINR_{cpsed}$ denotes a compensated CINR, $CINR_{msed}$ denotes a measured CINR, $N_{FFTSize}$ denotes a Fast Fourier Transform (FFT) size, that is, a time length of a ranging signal duration, $\alpha$ denotes a noise and interference power ratio of a duration starting earlier or ending later than a ranging channel duration to the ranging channel duration, Guard Sample (GS) denotes a time length of a CP duration and $Toffset_{msed}$ denotes a measured time offset and comprises a negative value whose absolute value is greater than GS;

$$CINR_{cpsed} = CINR_{msed} \cdot \frac{N_{FFTSize}}{N_{FFTSize} - \alpha \cdot (Toffset_{msed} - GS)},$$

wherein $CINR_{cpsed}$ denotes a compensated CINR, $CINR_{msed}$ denotes a measured CINR, $N_{FFTSize}$ denotes an FFT size, that is, a time length of a ranging signal duration, $\alpha$ denotes a noise and interference power ratio of a duration starting earlier or ending later than a ranging channel duration to the ranging channel duration, GS denotes a time length of a CP duration and $Toffset_{msed}$ denotes a measured time offset and comprises a positive value whose absolute value is greater than GS;

$$CINR_{cpsed} = \frac{N_{FFTSize} \cdot (1^{st}CINR_{msed} + 2^{nd}CINR_{msed})}{2 \cdot N_{FFTSize} - \alpha 1 \cdot (Toffset_{msed} - GS)},$$

wherein $CINR_{cpsed}$ denotes a compensated CINR, $N_{FFTSize}$ denotes an FFT size, that is, a time length of a ranging signal duration, $1^{st}CINR_{msed}$ denotes a CINR measured using a first ranging signal, $2^{nd}CINR_{msed}$ denotes a CINR measured using a second ranging signal, $\alpha 1$ denotes a noise and interference power ratio of a duration located behind of a ranging channel and a ranging channel duration, GS denotes a time length of a CP duration and $Toffset_{msed}$ denotes a measured time offset and comprises a positive value whose absolute value is greater than GS;

$$CINR_{cpsed} = \frac{N_{FFTSize} \cdot (1^{st}CINR_{msed} + 2^{nd}CINR_{msed})}{2 \cdot N_{FFTSize} + \alpha 2 \cdot (GS + Toffset_{msed})},$$

wherein $CINR_{cpsed}$ denotes a compensated CINR, $N_{FFTSize}$ denotes an FFT size, that is, a time length of a ranging signal duration, $1^{st}CINR_{msed}$ denotes a CINR measured using a first ranging signal, $2^{nd}CINR_{msed}$ denotes a CINR measured using a second ranging signal, $\alpha 2$ denotes a noise and interference power ratio of a duration located in front of a ranging channel and a ranging channel duration, GS denotes a time length of a CP duration and $Toffset_{msed}$ denotes a measured time offset and comprises a negative value whose absolute value is greater than GS;

$$CINR_{cpsed} = CINR_{msed} \cdot \frac{N_{FFTSize}}{N_{FFTSize} - \alpha 1 \cdot (Toffset_{msed} - GS)},$$

wherein $CINR_{cpsed}$ denotes a compensated CINR, $CINR_{msed}$ denotes a measured CINR, $N_{FFTSize}$ denotes an FFT size, that is, a time length of a ranging signal duration, $\alpha 1$ denotes a noise and interference power ratio of a duration located in front of a ranging channel and a ranging channel duration, GS denotes a time length of a CP duration and $Toffset_{msed}$ denotes a measured time offset and comprises a positive value whose absolute value is greater than GS; and $$CINR_{cpsed} = CINR_{msed} \cdot \frac{N_{FFTSize}}{N_{FFTSize} + \alpha 2 \cdot (GS + Toffset_{msed})},$$

wherein $CINR_{cpsed}$ denotes a compensated CINR, $CINR_{msed}$ denotes a measured CINR, $N_{FFTSize}$ denotes an FFT size, that is, a time length of a ranging signal duration, $\alpha 2$ denotes a noise and interference power ratio of a duration starting earlier or ending later than a ranging channel duration to the ranging channel duration, GS denotes a time length of a CP duration and $Toffset_{msed}$ denotes a measured time offset and comprises a negative value whose absolute value is greater than GS.

10. The method of claim 1, wherein the compensating for the distortion comprises:
determining a noise and interference power ratio of the duration starting earlier or ending later than the ranging channel duration comprised in the extraction section of the ranging signal to the ranging channel duration; and
compensating for distortion of the channel quality by using at least one of the noise and interference power ratio, the time length of a Cyclic Prefix (CP) duration, the time length of the ranging signal duration and the time offset.

11. The method of claim 10, wherein the compensating for the distortion comprises:
multiplying the noise and interference power ratio by the time length of the duration starting earlier or ending later than the ranging channel duration comprised in the extraction section of the ranging signal;

determining an effective measurement length of the extraction section of the ranging signal in consideration of the noise and interference power ratio by adding the multiplication result and the time length of the ranging signal duration;

determining a compensation coefficient by dividing the time length of the ranging signal duration by the effective measurement length of the extraction section of the ranging signal; and obtaining a compensated channel quality value by multiplying the compensation coefficient by the measured channel quality value.

12. The method of claim 11, wherein the compensated channel quality value is determined using one of the equations below:

$$CINR_{cpsed} = CINR_{msed} \cdot \frac{N_{FFTSize}}{N_{FFTSize} + \alpha \cdot (GS + Toffset_{msed})},$$

wherein $CINR_{cpsed}$ denotes a compensated CINR, $CINR_{msed}$ denotes a measured CINR, $N_{FFTSize}$ denotes an FFT size, that is, a time length of a ranging signal duration, $\alpha$ denotes a noise and interference power ratio of a duration starting earlier or ending later than a ranging channel duration to the ranging channel duration, GS denotes a time length of a CP duration and $Toffset_{msed}$ denotes a measured time offset and comprises a negative value whose absolute value is greater than GS;

$$CINR_{cpsed} = CINR_{msed} \cdot \frac{N_{FFTSize}}{N_{FFTSize} - \alpha \cdot (Toffset_{msed} - GS)},$$

wherein $CINR_{cpsed}$ denotes a compensated CINR, $CINR_{msed}$ denotes a measured CINR, $N_{FFTSize}$ denotes an FFT size, that is, a time length of a ranging signal duration, $\alpha$ denotes a noise and interference power ratio of a duration starting earlier or ending later than a ranging channel duration to the ranging channel duration, GS denotes a time length of a CP duration and $Toffset_{msed}$ denotes a measured time offset and comprises a positive value whose absolute value is greater than GS;

$$CINR_{cpsed} = \frac{N_{FFTSize} \cdot (1^{st}CINR_{msed} + 2^{nd}CINR_{msed})}{2 \cdot N_{FFTSize} - \alpha 1 \cdot (Toffset_{msed} - GS)},$$

wherein $CINR_{cpsed}$ denotes a compensated CINR, $N_{FFTSize}$ denotes an FFT size, that is, a time length of a ranging signal duration, $1^{st}CINR_{msed}$ denotes a CINR measured using a first ranging signal, $2^{nd}CINR_{msed}$ denotes a CINR measured using a second ranging signal, $\alpha 1$ denotes a noise and interference power ratio of a duration located behind of a ranging channel and a ranging channel duration, GS denotes a time length of a CP duration and $Toffset_{msed}$ denotes a measured time offset and comprises a positive value whose absolute value is greater than GS;

$$CINR_{cpsed} = \frac{N_{FFTSize} \cdot (1^{st}CINR_{msed} + 2^{nd}CINR_{msed})}{2 \cdot N_{FFTSize} + \alpha 2 \cdot (GS + Toffset_{msed})},$$

wherein $CINR_{cpsed}$ denotes a compensated CINR, $N_{FFTSize}$ denotes an FFT size, that is, a time length of a ranging signal duration, $1^{st}CINR_{msed}$ denotes a CINR measured using a first ranging signal, $2^{nd}CINR_{msed}$ denotes a CINR measured using a second ranging signal, $\alpha 2$ denotes a noise and interference power ratio of a duration located in front of a ranging channel and a ranging channel duration, GS denotes a time length of a CP duration and $Toffset_{msed}$ denotes a measured time offset and comprises a negative value whose absolute value is greater than GS;

$$CINR_{cpsed} = CINR_{msed} \cdot \frac{N_{FFTSize}}{N_{FFTSize} - \alpha 1 \cdot (Toffset_{msed} - GS)},$$

wherein $CINR_{cpsed}$ denotes a compensated CINR, $CINR_{msed}$ denotes a measured CINR, $N_{FFTSize}$ denotes an FFT size, that is, a time length of a ranging signal duration, $\alpha 1$ denotes a noise and interference power ratio of a duration located in front of a ranging channel and a ranging channel duration, GS denotes a time length of a CP duration and $Toffset_{msed}$ denotes a measured time offset and comprises a positive value whose absolute value is greater than GS; and $$CINR_{cpsed} = CINR_{msed} \cdot \frac{N_{FFTSize}}{N_{FFTSize} + \alpha 2 \cdot (GS + Toffset_{msed})},$$

wherein $CINR_{cpsed}$ denotes a compensated CINR, $CINR_{msed}$ denotes a measured CINR, $N_{FFTSize}$ denotes an FFT size, that is, a time length of a ranging signal duration, $\alpha 2$ denotes a noise and interference power ratio of a duration starting earlier or ending later than a ranging channel duration to the ranging channel duration, GS denotes a time length of a CP duration and $Toffset_{msed}$ denotes a measured time offset and comprises a negative value whose absolute value is greater than GS.

13. A Base Station (BS) apparatus for measuring channel quality by using a ranging signal in a wireless system, the apparatus comprising at least one processor and configured to perform operations of:

an offset estimating unit configured to estimate a time offset of the ranging signal received through a ranging channel;

a channel quality measuring unit configured to measure channel quality by using a signal from an extraction section of the ranging signal determined based on the estimated time offset; and a channel quality compensation unit configured to determine whether the extraction section of the ranging signal starts no earlier and ends no later than a ranging channel duration by using the time offset, to determine whether distortion occurs in the measured channel quality based on a result of the determination of whether the extraction section of the ranging signal starts no earlier and ends no later than the ranging channel duration, and for compensating for distortion of the measured channel quality, wherein the ranging channel duration comprises one of an initial ranging signal comprising exactly two symbols in a time axis and a periodic ranging signal comprising exactly one symbol in the time axis.

14. The apparatus of claim 13, wherein the channel quality compensation unit determines that distortion occurs, if the extraction section of the ranging signal starts earlier or ends later than the ranging channel duration, and determines that the distortion does not occur, if the extraction section of the ranging signal starts no earlier and ends no later than the ranging channel duration.

15. The apparatus of claim 14, wherein, when the ranging channel is defined as two symbol durations and a first ranging signal is extracted, the channel quality compensation unit determines that the extraction section of the ranging signal starts earlier than the ranging channel duration if the time offset comprises a negative value and if an absolute value of the time offset is greater than a time length of a Cyclic Prefix (CP) duration.

16. The apparatus of claim 14, wherein, when the ranging channel is defined as two symbol durations and a second ranging signal is extracted, the channel quality compensation unit determines that the extraction section of the ranging signal ends later than the ranging channel duration if the time offset comprises a positive value and if an absolute value of the time offset is greater than a time length of a Cyclic Prefix (CP) duration.

17. The apparatus of claim 14, wherein, when the ranging channel is defined as two symbol durations and two ranging signals are both extracted, the channel quality compensation unit determines that the extraction section of the ranging signal starts earlier or ends later than the ranging channel duration if the time offset is a negative value or a positive value and if an absolute value of the time offset is greater than a time length of a Cyclic Prefix (CP) duration.

18. The apparatus of claim 14, wherein, when the ranging channel is defined as one symbol duration, the channel quality compensation unit determines that the extraction section of the ranging signal starts earlier or ends later than the ranging channel duration if one of the time offset comprise a negative value and if an absolute value of the time offset is greater than a time length of a Cyclic Prefix (CP) duration, and the time offset comprises a positive value.

19. The apparatus of claim 13, wherein the channel quality compensation unit searches a table comprising channel quality values determined using at least one of a noise and interference power ratio of a duration that starts earlier or ends later than the ranging channel duration comprised in the extraction section of the ranging signal to the ranging channel duration, a time length of a Cyclic Prefix (CP) duration, a time length of the ranging signal and a time offset to find one compensated channel quality value corresponding to a combination of the time offset and the measured channel quality.

20. The apparatus of claim 19, wherein the compensated channel quality values are determined by multiplying the measured channel quality value by a compensation coefficient whose denominator determines an effective measurement length obtained from the time offset and the noise and interference ratio.

21. The apparatus of claim 20, wherein the compensated channel quality values are determined using one of the equations below:

$$CINR_{cpsed} = CINR_{msed} \cdot \frac{N_{FFTSize}}{N_{FFTSize} + \alpha \cdot (GS + Toffset_{msed})},$$

wherein $CINR_{cpsed}$ denotes a compensated CINR, $CINR_{msed}$ denotes a measured CINR, $N_{FFTSize}$ denotes a Fast Fourier Transform (FFT) size, that is, a time length of a ranging signal duration, a denotes a noise and interference power ratio of a duration other that starts earlier or ends later than a ranging channel duration to the ranging channel duration, Guard Sample (GS) denotes a time length of a CP duration and $Toffset_{msed}$ denotes a measured time offset and comprises a negative value whose absolute value is greater than GS;

$$CINR_{cpsed} = CINR_{msed} \cdot \frac{N_{FFTSize}}{N_{FFTSize} - \alpha \cdot (Toffset_{msed} - GS)},$$

wherein $CINR_{cpsed}$ denotes a compensated CINR, $CINR_{msed}$ denotes a measured CINR, $N_{FFTSize}$ denotes an FFT size, that is, a time length of a ranging signal duration, a denotes a noise and interference power ratio of a duration other that starts earlier or ends later than a ranging channel duration to the ranging channel duration, GS denotes a time length of a CP duration and $Toffset_{msed}$ denotes a measured time offset and comprises a positive value whose absolute value is greater than GS;

$$CINR_{cpsed} = \frac{N_{FFTSize} \cdot (1^{st}CINR_{msed} + 2^{nd}CINR_{msed})}{2 \cdot N_{FFTSize} - \alpha 1 \cdot (Toffset_{msed} - GS)},$$

wherein $CINR_{cpsed}$ denotes a compensated CINR, $N_{FFTSize}$ denotes an FFT size, that is, a time length of a ranging signal duration, $1^{st}CINR_{msed}$ denotes a CINR measured using a first ranging signal, $2^{nd}CINR_{msed}$ denotes a CINR measured using a second ranging signal, $\alpha 1$ denotes a noise and interference power ratio of a duration located behind of a ranging channel and a ranging channel duration, GS denotes a time length of a CP duration and $Toffset_{msed}$ denotes a measured time offset and comprises a positive value whose absolute value is greater than GS;

$$CINR_{cpsed} = \frac{N_{FFTSize} \cdot (1^{st}CINR_{msed} + 2^{nd}CINR_{msed})}{2 \cdot N_{FFTSize} + \alpha 2 \cdot (GS + Toffset_{msed})},$$

wherein $CINR_{cpsed}$ denotes a compensated CINR, $N_{FFTSize}$ denotes an FFT size, that is, a time length of a ranging signal duration, $1^{st}CINR_{msed}$ denotes a CINR measured using a first ranging signal, $1^{nd}CINR_{msed}$ denotes a CINR measured using a second ranging signal, $\alpha 2$ denotes a noise and interference power ratio of a duration located in front of a ranging channel and a ranging channel duration, GS denotes a time length of a CP duration and $Toffset_{msed}$ denotes a measured time offset and comprises a negative value whose absolute value is greater than GS;

$$CINR_{cpsed} = CINR_{msed} \cdot \frac{N_{FFTSize}}{N_{FFTSize} - \alpha 1 \cdot (Toffset_{msed} - GS)},$$

wherein $CINR_{cpsed}$ denotes a compensated CINR, $CINR_{msed}$ denotes a measured CINR, $N_{FFTSize}$ denotes an FFT size, that is, a time length of a ranging signal duration, $\alpha 1$ denotes a noise and interference power ratio of a duration located in front of a ranging channel and a ranging channel duration, GS denotes a time length of a CP duration and $Toffset_{msed}$ denotes a measured time offset and comprises a positive value whose absolute value is greater than GS; and $$CINR_{cpsed} = CINR_{msed} \cdot \frac{N_{FFTSize}}{N_{FFTSize} + \alpha 2 \cdot (GS + Toffset_{msed})},$$

wherein $CINR_{cpsed}$ denotes a compensated CINR, $CINR_{msed}$ denotes a measured CINR, $N_{FFTSize}$ denotes an FFT size, that is, a time length of a ranging signal duration, $\alpha 2$ denotes a noise and interference power ratio of a duration that starts earlier or ends later than a ranging channel duration to the ranging channel duration, GS denotes a time length of a CP duration and $Toffset_{msed}$ denotes a measured time offset and comprises a negative value whose absolute value is greater than GS.

22. The apparatus of claim 13, wherein the channel quality compensation unit determines a noise and interference power ratio of the duration that starts earlier or ends later than the ranging channel duration comprised in the extraction section of the ranging signal to the ranging channel duration, and compensates for distortion of the channel quality by using at least one of the noise and interference power ratio, the time length of a Cyclic Prefix (CP) duration, the time length of the ranging signal duration and the time offset.

23. The apparatus of claim 22, wherein the channel quality compensation unit multiplies the noise and interference power ratio by the time length of the duration that starts earlier or ends later than the ranging channel duration comprised in the extraction section of the ranging signal, determines an effective measurement length of the extraction section of the ranging signal in consideration of the noise and interference power ratio by adding the multiplication result and the time length of the ranging signal duration, determines a compensation coefficient by dividing the time length of the ranging signal duration by the effective measurement length of the extraction section of the ranging signal, and obtains a compensated channel quality value by multiplying the compensation coefficient by the measured channel quality value.

24. The apparatus of claim 23, wherein the compensated channel quality value is determined using one of the equations below:

$$CINR_{cpsed} = CINR_{msed} \cdot \frac{N_{FFTSize}}{N_{FFTSize} + \alpha \cdot (GS + Toffset_{msed})},$$

wherein $CINR_{cpsed}$ denotes a compensated CINR, $CINR_{msed}$ denotes a measured CINR, $N_{FFTSize}$ denotes an FFT size, that is, a time length of a ranging signal duration, $\alpha$ denotes a noise and interference power ratio of a duration that starts earlier or ends later than a ranging channel duration to the ranging channel duration, GS denotes a time length of a CP duration and $Toffset_{msed}$ denotes a measured time offset and comprises a negative value whose absolute value is greater than GS;

$$CINR_{cpsed} = CINR_{msed} \cdot \frac{N_{FFTSize}}{N_{FFTSize} - \alpha \cdot (Toffset_{msed} - GS)},$$

wherein $CINR_{cpsed}$ denotes a compensated CINR, $CINR_{msed}$ denotes a measured CINR, $N_{FFTSize}$ denotes an FFT size, that is, a time length of a ranging signal duration, $\alpha$ denotes a noise and interference power ratio of a duration other that starts earlier or ends later than a ranging channel duration to the ranging channel duration, GS denotes a time length of a CP duration and $Toffset_{msed}$ denotes a measured time offset and comprises a positive value whose absolute value is greater than GS;

$$CINR_{cpsed} = \frac{N_{FFTSize} \cdot (1^{st}CINR_{msed} + 2^{nd}CINR_{msed})}{2 \cdot N_{FFTSize} - \alpha 1 \cdot (Toffset_{msed} - GS)},$$

wherein $CINR_{cpsed}$ denotes a compensated CINR, $N_{FFTSize}$ denotes an FFT size, that is, a time length of a ranging signal duration, $1^{st}CINR_{msed}$ denotes a CINR measured using a first ranging signal, $2^{nd}CINR_{msed}$ denotes a CINR measured using a second ranging signal, $\alpha 1$ denotes a noise and interference power ratio of a duration located behind of a ranging channel and a ranging channel duration, GS denotes a time length of a CP duration and $Toffset_{msed}$ denotes a measured time offset and comprises a positive value whose absolute value is greater than GS;

$$CINR_{cpsed} = \frac{N_{FFTSize} \cdot (1^{st}CINR_{msed} + 2^{nd}CINR_{msed})}{2 \cdot N_{FFTSize} + \alpha 2 \cdot (GS + Toffset_{msed})},$$

wherein $CINR_{cpsed}$ denotes a compensated CINR, $N_{FFTSize}$ denotes an FFT size, that is, a time length of a ranging signal duration, $1^{st}CINR_{msed}$ denotes a CINR measured using a first ranging signal, $2^{nd}CINR_{msed}$ denotes a CINR measured using a second ranging signal, $\alpha 2$ denotes a noise and interference power ratio of a duration located in front of a ranging channel and a ranging channel duration, GS denotes a time length of a CP duration and $Toffset_{msed}$ denotes a measured time offset and comprises a negative value whose absolute value is greater than GS;

$$CINR_{cpsed} = CINR_{msed} \cdot \frac{N_{FFTSize}}{N_{FFTSize} - \alpha 1 \cdot (Toffset_{msed} - GS)},$$

wherein $CINR_{cpsed}$ denotes a compensated CINR, $CINR_{msed}$ denotes a measured CINR, $N_{FFTSize}$ denotes an FFT size, that is, a time length of a ranging signal duration, $\alpha 1$ denotes a noise and interference power ratio of a duration located in front of a ranging channel and a ranging channel duration, GS denotes a time length of a CP duration and $Toffset_{msed}$ denotes a measured time offset and comprises a positive value whose absolute value is greater than GS; and $$CINR_{cpsed} = CINR_{msed} \cdot \frac{N_{FFTSize}}{N_{FFTSize} + \alpha 2 \cdot (GS + Toffset_{msed})},$$

wherein $CINR_{cpsed}$ denotes a compensated CINR, $CINR_{msed}$ denotes a measured CINR, $N_{FFTSize}$ denotes an FFT size, that is, a time length of a ranging signal duration, $\alpha 2$ denotes a noise and interference power ratio of a duration that starts earlier or ends later than a ranging channel duration to the ranging channel duration, GS denotes a time length of a CP duration and $Toffset_{msed}$ denotes a measured time offset and comprises a negative value whose absolute value is greater than GS.

* * * * *